(12) United States Patent
Wood et al.

(10) Patent No.: US 11,649,834 B2
(45) Date of Patent: May 16, 2023

(54) ENGINE SYSTEMS AND METHODS

(71) Applicant: General Electric Company, Schenectady, NY (US)

(72) Inventors: Trevor Wood, Clifton Park, NY (US); Kishore Ramakrishnan, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/582,931

(22) Filed: Jan. 24, 2022

(65) Prior Publication Data

US 2022/0145904 A1 May 12, 2022

Related U.S. Application Data

(63) Continuation of application No. 15/887,340, filed on Feb. 2, 2018, now Pat. No. 11,255,343.

(51) Int. Cl.
| | |
|---|---|
| *F04D 29/54* | (2006.01) |
| *F04D 29/66* | (2006.01) |
| *F01D 9/04* | (2006.01) |
| *F02C 3/04* | (2006.01) |

(52) U.S. Cl.
CPC .......... *F04D 29/544* (2013.01); *F01D 9/042* (2013.01); *F04D 29/667* (2013.01); *F02C 3/04* (2013.01); *F05D 2220/323* (2013.01); *F05D 2230/80* (2013.01); *F05D 2240/121* (2013.01); *F05D 2240/122* (2013.01); *F05D 2260/96* (2013.01)

(58) Field of Classification Search
None
See application file for complete search history.

(56) References Cited

U.S. PATENT DOCUMENTS

| | | | |
|---|---|---|---|
| 4,659,282 A | 4/1987 | Popp | |
| 5,167,489 A | 12/1992 | Wadia et al. | |
| 6,195,983 B1 | 3/2001 | Wadia et al. | |
| 6,554,564 B1 * | 4/2003 | Lord | F04D 29/544 |
| | | | 415/119 |
| 6,554,569 B2 | 4/2003 | Decker et al. | |
| 8,221,071 B2 | 7/2012 | Wojno et al. | |
| 9,249,666 B2 | 2/2016 | Wood et al. | |

(Continued)

FOREIGN PATENT DOCUMENTS

| | | |
|---|---|---|
| CN | 1453466 | 11/2003 |
| WO | 20009103528 | 8/2009 |

OTHER PUBLICATIONS

Edmane Envia, "Fan Noise Reduction: An Overview", International Journal of Aeroacoustics, vol. 1, Issue: 1, pp. 43-64, Jan. 1, 2002.

(Continued)

*Primary Examiner* — Sabbir Hasan
(74) *Attorney, Agent, or Firm* — Hanley, Flight & Zimmerman, LLC

(57) ABSTRACT

Disclosed examples include a retrofit fan frame assembly, comprising: a leading edge adjustment component coupleable to an airfoil, the leading edge adjustment component of variable chord length, the variable chord length to increase and then decrease along a radial length from a hub end of the airfoil to an opposite tip end of the airfoil; and an attachment mechanism configured to couple the leading edge adjustment component to a leading edge of the airfoil.

20 Claims, 5 Drawing Sheets

(56) References Cited

U.S. PATENT DOCUMENTS

| | | | |
|---|---|---|---|
| 11,255,343 | B2 | 2/2022 | Wood et al. |
| 2008/0159851 | A1 | 7/2008 | Moniz et al. |
| 2010/0284815 | A1 | 11/2010 | Parker et al. |
| 2015/0252728 | A1 | 9/2015 | Veiga |
| 2018/0017075 | A1 | 1/2018 | Bailey et al. |
| 2018/0135446 | A1 | 5/2018 | Propheter-Hinckley et al. |
| 2019/0242406 | A1 | 8/2019 | Wood et al. |
| 2020/0355085 | A1* | 11/2020 | Lemarchand ......... F04D 29/663 |

OTHER PUBLICATIONS

Marn et al., Comparison of the Aerodynamics of Acoustically Designed Exit Guide Vanes and a State-of-the-Art Exit Guide Vane, Journal of Turbomachinery, vol. 137, Issue: 4, pp. 10, Oct. 28, 2014.

Chinese Patent Office, "Office Action," issued in connection with CN patent application No. 201910098798.0, dated Jan. 14, 2021, 7 pages.

United States Patent and Trademark Office, "Non-Final Office Action," issued in connection with U.S. Appl. No. 15/887,340, dated Jan. 8, 2020, 15 pages.

United States Patent and Trademark Office, "Notice of Allowance," issued in connection with U.S. Appl. No. 15/887,340, dated Oct. 5, 2020, 7 pages.

United States Patent and Trademark Office, "Non-Final Office Action," issued in connection with U.S. Appl. No. 15/887,340, dated Apr. 29, 2021, 22 pages.

United States Patent and Trademark Office, "Notice of Allowance," issued in connection with U.S. Appl. No. 15/887,340, dated Sep. 22, 2021, 7 pages.

Chinese Patent Office, "Office Action," issued in connection with CN patent application No. 201910098798.0, dated Sep. 3, 2021, 12 pages.

Chinese Patent Office, "Office Action," issued in connection with CN patent application No. 201910098798.0, dated Feb. 25, 2022, 7 pages.

United States Patent and Trademark Office, "Non-Final Office Action," issued in connection with U.S. Appl. No. 15/887,340, dated Jan. 8, 2020, 15 pages. (Applicant will provide document upon request from Examiner.).

United States Patent and Trademark Office, "Notice of Allowance," issued in connection with U.S. Appl. No. 15/887,340, dated Oct. 5, 2020, 7 pages. (Applicant will provide document upon request from Examiner.).

United States Patent and Trademark Office, "Non-Final Office Action," issued in connection with U.S. Appl. No. 15/887,340, dated Apr. 29, 2021, 22 pages. (Applicant will provide document upon request from Examiner.).

United States Patent and Trademark Office, "Notice of Allowance," issued in connection with U.S. Appl. No. 15/887,340, dated Sep. 22, 2021, 7 pages. (Applicant will provide document upon request from Examiner.).

\* cited by examiner

ENGINE SYSTEMS AND METHODS

RELATED APPLICATION

This patent claims the benefit of U.S. patent application Ser. No. 15/887,340, filed Feb. 2, 2018, which is hereby incorporated herein by reference in its entirety. Priority to U.S. patent application Ser. No. 15/887,340, is hereby claimed.

FIELD

The subject matter described herein relates to aircraft systems.

BACKGROUND

During operation of a gas turbine engine assembly, airflow is channeled from a fan assembly to a fan stream exhaust. Rotating fan blades of the fan assembly generate air wakes that interfere with outlet guide vanes downstream from the fan blades. The outlet guide vanes may reduce an amount of swirl that is present in the air wake by turning the flow of air from the fan. Additionally, the air wake interferes with the outlet guide vanes to generate aerodynamic noise. Such aerodynamic noise may be seen as a nuisance or discomfort to aircraft passengers, or may exceed a noise ordinance law or requirement.

In addition to turning the fan airflow, the outlet guide vanes may also provide structural stiffness to the fan frame. More specifically, the outlet guide vanes may be integrated with the fan frame, forming an integrated fan frame assembly.

Known systems for reducing an amount of aerodynamic noise include outlet guide vane sweeps at leading and trailing edges of the outlet guide vane. Sweeping the leading and trailing edges also maintains the outlet guide vane chord length between the leading and trailing edges. Although sweeping the leading and trailing edges reduces a level of aerodynamic noise generated by the outlet guide vanes, sweeping the leading and trailing edges also reduces an amount of structural stiffness provided by the outlet guide vanes that are integrated with the fan frame assembly.

BRIEF DESCRIPTION

In one embodiment, a system includes an airfoil configured to be disposed inside of an engine assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The airfoil includes a sweep feature disposed at the leading edge of the airfoil. The sweep feature is shaped to alter the air inside the engine assembly. Altering the air inside the engine assembly reduces a surface unsteady pressure level on the airfoil relative to the leading edge not including the sweep feature. The system also includes a fan frame assembly comprising an inner surface and an outer surface. The hub end of the airfoil is configured to be operably coupled with the inner surface of the fan frame assembly and the tip end of the airfoil is configured to be operably coupled with the outer surface of the fan frame assembly. The airfoil is configured to be integrated with the fan frame assembly of the system such that the airfoil increases a structural load supporting capability of the fan frame assembly relative to the airfoil not being integrated with the fan frame assembly.

In one embodiment, an airfoil is configured to be disposed inside of an engine assembly including a fan frame assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The leading edge of the airfoil includes a sweep feature that is shaped to alter the air inside the engine assembly. Altering the air inside the engine assembly reduces a surface unsteady pressure level on the airfoil relative to the leading edge not including the sweep feature. The hub end of the airfoil is configured to be operably coupled with an inner surface of the fan frame assembly and the tip end of the airfoil is configured to be operably coupled with an outer surface of the fan frame assembly. The airfoil is configured to be integrated with the fan frame assembly such that the airfoil increases a structural load supporting capability of the fan frame assembly relative to the airfoil not be integrated with the fan frame assembly.

In one embodiment, a method includes integrating an airfoil configured to be disposed inside an engine assembly with a fan frame assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The airfoil includes a sweep feature disposed at the leading edge of the airfoil. The sweep feature is shaped to alter the air inside the engine assembly. The fan frame assembly includes an inner surface and an outer surface. The hub end of the airfoil is configured to be operably coupled with the inner surface of the fan frame assembly and the tip end of the airfoil is configured to be operably coupled with the outer surface of the fan frame assembly. The airfoil integrated with the fan frame assembly increases a structural load supporting capability of the fan frame assembly relative to the airfoil not being integrated with the fan frame assembly. The method also includes altering the air inside the engine assembly with the sweep feature of the leading edge of the airfoil. Altering the air inside the engine assembly reduces a surface unsteady pressure level on the airfoil relative to the leading edge not including the sweep feature.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relates to systems and methods that include an airfoil that is integrated with a fan frame assembly disposed inside of an engine assembly. Integrating the airfoil with the fan frame assembly improves a structural load supporting capability of the fan frame assembly relative to the airfoil not being integrated with the fan frame assembly. Additionally, a sweep feature can be provided at a leading edge of the airfoil that alters the air inside the engine assembly. Altering the air flow inside the engine assembly with the sweep feature improves the reduction of an amount of surface pressure exerted on the airfoil by the air and reduces the noise generated by the engine assembly relative to the leading edge of the airfoil not including the sweep feature.

Figure 1:
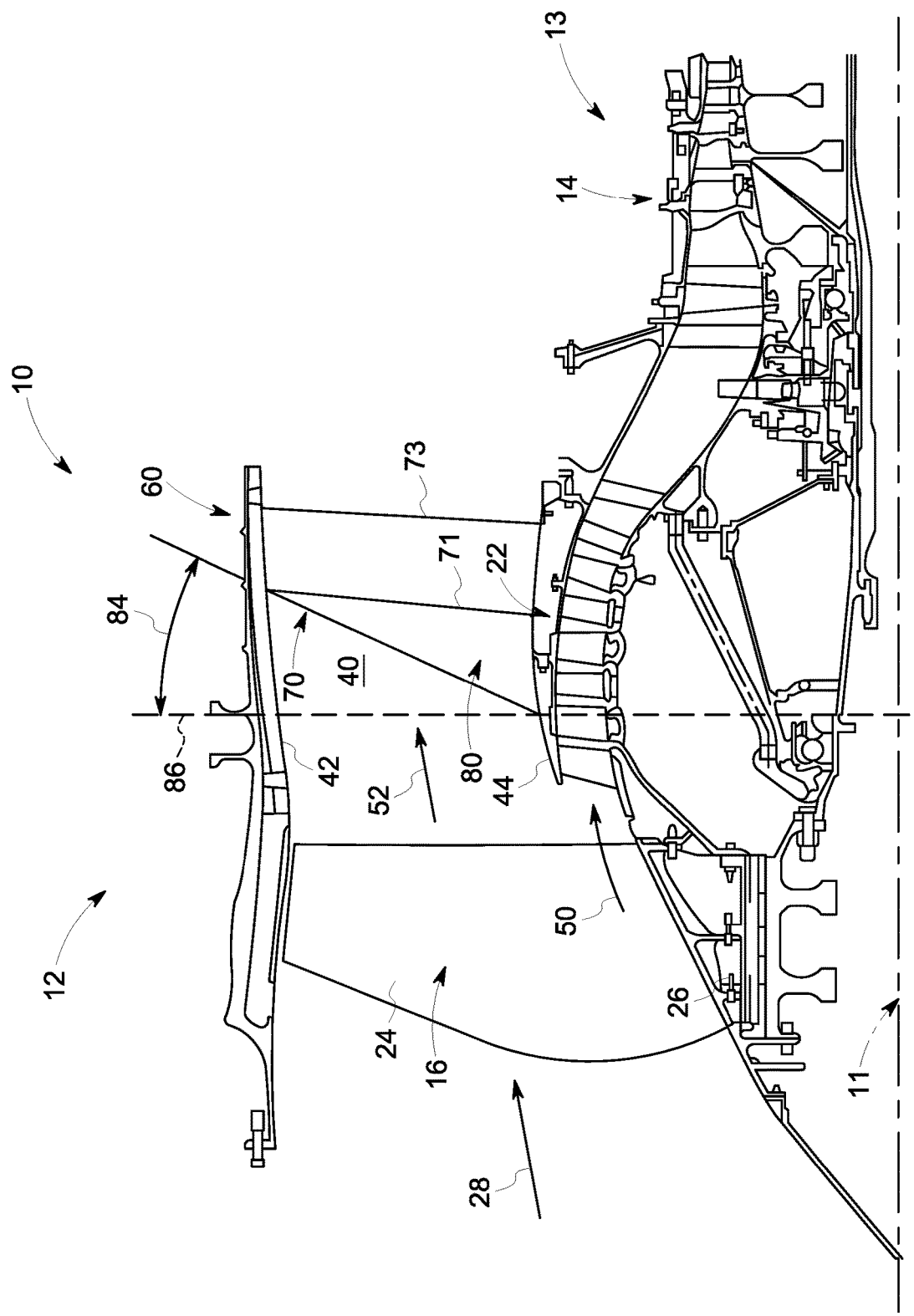
FIG. 1 illustrates a cross-sectional view of a gas turbine engine assembly in accordance with one embodiment.

FIG. 1 illustrates a partial cross-sectional view of a gas turbine engine assembly 12 in accordance with one embodiment. The gas turbine engine assembly 12 is elongated along a central axis 11. The engine assembly 12 includes a fan assembly 16 and a core gas turbine engine 13. The engine 13 includes, among other things, a high pressure compressor 14, a combustor (not shown), and a high pressure turbine (not shown). The engine assembly 12 may also include, among other things, a low pressure turbine, a multi-stage booster compressor 22, and a splitter 44 that substantially circumscribes the booster 22.

The fan assembly 16 includes an array of fan blades 24 extending radially outward from a rotor disk 26. The engine assembly 12 includes an intake side 28 and an exhaust side (not shown). In operation, air flows in to the engine assembly 12 at the intake side 28 and through the fan assembly 16. A first portion 50 of the airflow is channeled through the booster 22. The compressed air that is discharged from the booster 22 is channeled through the compressor 14 wherein the airflow is further compressed and is delivered to a combustor (not shown). Hot products of combustion (not shown) from the combustor are utilized to drive turbines of the engine assembly 12. The engine assembly 12 is operable at a range of operating conditions between design operating conditions, off-design operating conditions, or the like.

A second portion 52 of the airflow discharged from the fan assembly 16 is channeled through a bypass duct 40 to bypass a portion of the airflow from the fan assembly 16 and around the core gas turbine engine 13. The bypass duct 40 extends between a fan casing or shroud 42 and the splitter 44. For example, the first portion 50 of the airflow from the fan assembly 16 is channeled through the booster 22 and then into the compressor 14, and the second portion 52 of the airflow from the fan assembly 16 is channeled through the bypass duct 40 to provide thrust for an aircraft. The engine assembly 12 also includes a fan frame assembly 60 that includes, among other things, the fan casing or shroud 42, and provides structural support for the fan assembly 16 to the core gas turbine engine 13. The fan frame assembly 60 may also include a plurality of outlet guide vanes that typically extend substantially radially, between a radially-outer mounting flange and a radially-inner mounting flange, and are circumferentially-spaced within the bypass duct 40. The fan frame assembly 60 may also include a plurality of struts that are coupled between a radially outer mounting flange and a radially inner mounting flange. The fan frame assembly 60 will be described in more detail with reference to FIG. 2.

Figure 2:
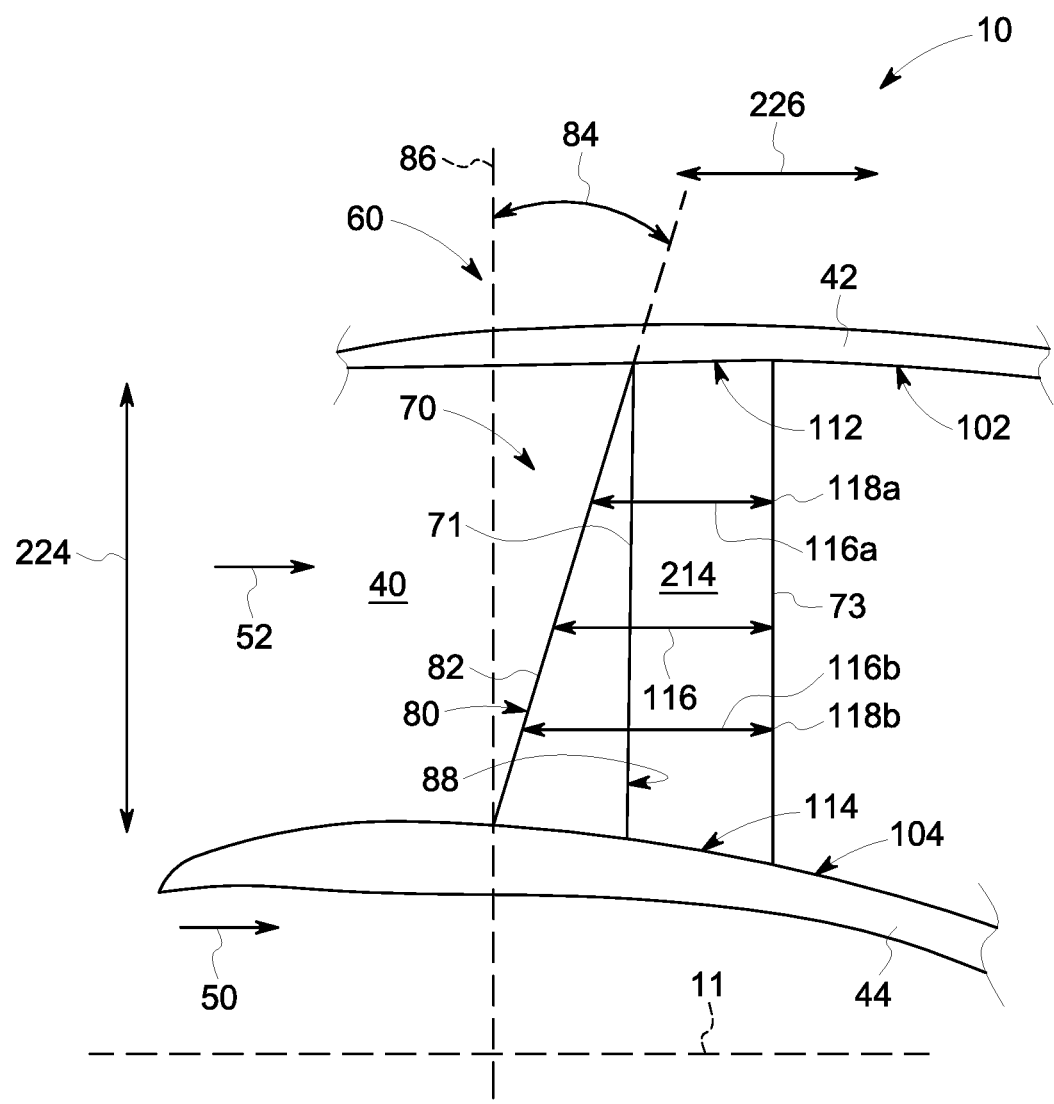
FIG. 2 illustrates a partial cross-sectional view of a system of the gas turbine engine assembly of FIG. 1 in accordance with one embodiment.
Figure 3:
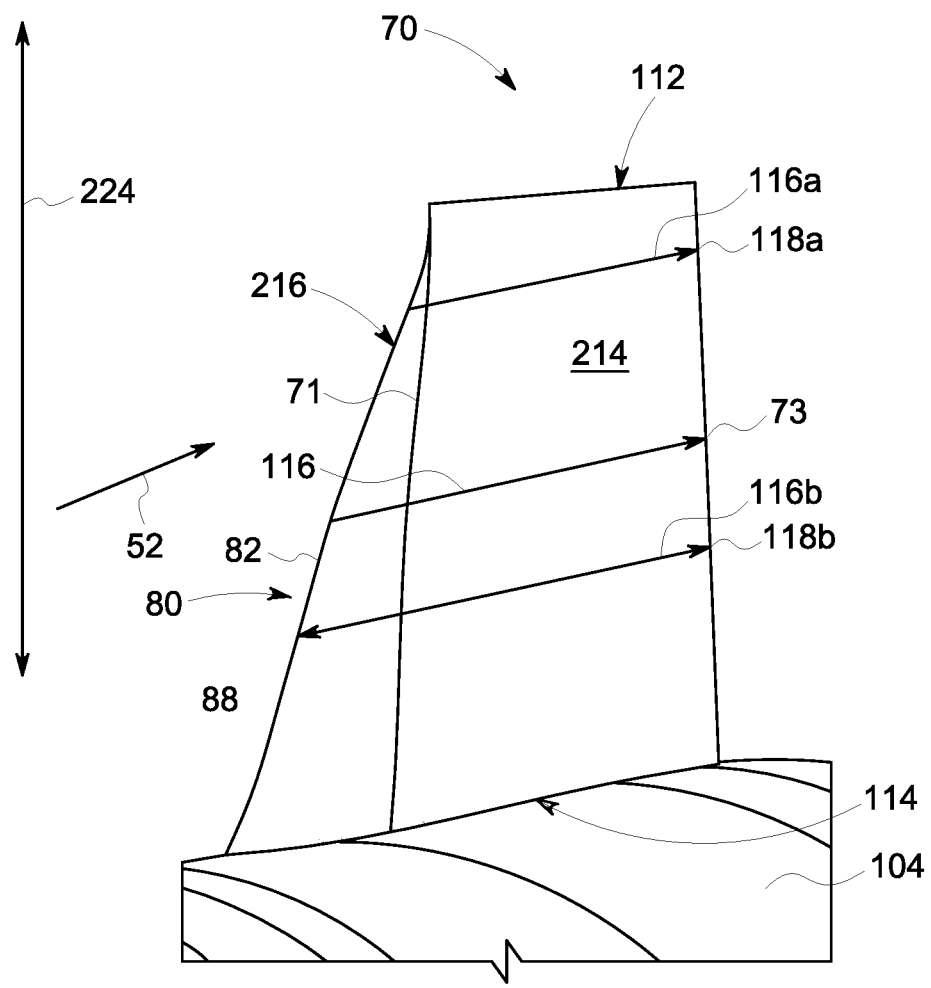
FIG. 3 illustrates a perspective view of an airfoil in accordance with one embodiment.

FIG. 2 illustrates a partial cross-sectional view of a system 10 of the engine assembly 12 in accordance with one embodiment. FIG. 3 is a perspective view of an airfoil 70 in accordance with one embodiment. FIGS. 2 and 3 will be described in detail together.

The system 10 includes the fan frame assembly 60 and a plurality of airfoils 70. The airfoils 70 may also be referred to herein as outlet guide vanes 70. In the illustrated embodiment, a single airfoil 70 is shown, however the engine assembly 12 may include any number of airfoils 70 that are disposed circumferentially about the central axis 11.

The airfoil 70 is shaped such that it directs the second portion 52 of air inside the engine assembly 12. For example, the outlet guide vanes 70 turn the airflow that is directed downstream from the rotating fan blades 24 of FIG. 1. The airfoil 70 extends an axial length 226 between a leading edge 71 and a trailing edge 73 of each of the airfoils 70. Optionally, the axial length 226 may be referred to herein as a chordwise length or chord length between the leading and trailing edges 71, 73. The leading edge 71 is disposed proximate the fan blade 24 (of FIG. 1) relative to the trailing edge 73 along the axial length 226. For example, the trailing edge 73 is located downstream from the leading edge 71 of the airfoil 70 as the second portion 52 of the airflow moves inside of the engine assembly 12.

The airfoil 70 includes a pressure side 214 and a suction side 216 that is opposite the pressure side 214. The pressure side 214 and the suction side 216 are interconnected by the leading edge 71 and the trailing edge 73 that is opposite the leading edge 71. The pressure side 214 is generally concave in shape, and the suction side is generally convex in shape between the leading and trailing edges 71, 73. For example, the generally concave pressure side 214 and the generally convex suction side 216 provide an aerodynamic surface over which the second portion 52 of the compressed working fluid (e.g., the air inside the engine assembly 12) flows through the engine assembly 12.

The airfoil 70 extends substantially or predominantly radially in a radial direction 224 between a hub end 114 of the airfoil 70 and an opposite tip end 112 of the airfoil 70. Additionally, the leading edge 71 and the trailing edge 73 extend substantially radially about the central axis 11. The airfoil 70 is integrated with the fan frame system 60 such that the hub end 114 is operably coupled with an inner surface 104 of the fan frame assembly 60 and the tip end 112 is operably coupled with an outer surface 102 of the fan frame assembly 60. For example, the inner surface 104 of the fan frame assembly 60 may be a surface of the splitter 44, and the outer surface 102 of the fan frame assembly 60 may be a surface of the fan casing 42. Optionally, the inner surface 104 may be referred to as a radially-outward flow path surface and the outer surface 102 may be referred to as a radially-inner flow path surface. For example, the inner surface 104 is a radially-outward facing flow path surface such that the inner surface 104 faces a direction away from the central axis 11 in the radial direction 224 and the flow of the air through the fan frame assembly 60 passes over the inner surface 104. Additionally, the outer surface is a radially-inward facing mounting flange such that the outer surface 102 faces a direction towards the central axis 11 in the radial direction 224 and the flow of the air through the fan frame assembly 60 passes inside of the outer surface 102.

The leading edge 71 of each of the plural airfoils 70 includes a sweep feature 80. Optionally, the sweep feature 80 may also be referred to herein as a sweep structure, sweep body, or the like. The sweep feature 80 is shaped to alter the air (e.g., the second portion 52 of the airflow) in the engine assembly 12. The sweep feature 80 extends between an inner edge 88 and an interference edge 82 along the axial length 226. Optionally, the interference edge 82 may also be referred to herein as a new leading edge 82. The inner edge 88 is operably coupled with the leading edge 71 of the airfoil 70. For example, the inner edge 88 and the leading edge 71 share a mating surface.

In one or more embodiments, the sweep feature 80 and the airfoil 70 may be formed as a unitary body. For example, the sweep feature 80 may be cast, machined, stamped, or the like, with the airfoil 70. Additionally or alternatively, the sweep feature 80 may be fitted onto (e.g., coupled with, or the like) a new or an existing airfoil 70 For example, the existing airfoil may have been previously used in one or more test simulation cycles or may have been previously used in service during one or more normal operating duty cycles, or the like. The sweep feature 80 may be retrofitted onto the airfoil 70 by any attachment methods such as, but not limited to, welding, bolting, adhering, or the like.

The interference edge 82 (e.g., the new leading edge 82) of the sweep feature 80 includes a non-zero sweep angle 84 relative to a line 86 that is substantially or predominantly perpendicular to the central axis 11 of the engine assembly 12. For example, the interference edge 82 is distinctly unrelated to the shape of the trailing edge 73 of the airfoil 70. In the illustrated embodiment, the interference edge 82 has a positive non-zero sweep angle 84 that is substantially uniform between the hub end 114 and the tip end 112 of the airfoil 70 along the radial length 224. Additionally, the trailing edge 73 is substantially radial between the hub end 114 and the tip end 112 of the airfoil 70 along the radial length 224. Optionally, the new leading edge 82 may have a non-zero sweep angle 84 that may be non-uniform or may change at different radial positions along the new leading edge 82 between the hub end 114 and the tip end 112 of the airfoil 70 along the radial length 224. For example, the non-zero sweep angle 84 may be a positive and/or negative non-zero sweep angle, may increase then decrease, decrease then increase, or any combination therein along the radial length 224.

The sweep feature 80 is separated from the trailing edge 73 of the airfoil 70 by a variable chord length 116. The variable chord length 116 extends generally chord-wise between the trailing edge 73 and the interference edge 82 of the sweep feature 80. The variable chord length 116 varies (e.g., is different or changes) at different radial positions of the airfoil 70. For example, the variable chord length between the trailing edge 73 and the interference edge 82 of the sweep feature varies with respect to the shape of the sweep feature 80. In the illustrated embodiment of FIGS. 2 and 3, the variable chord length 116 extends a first length 116a at a first radial position 118a of the airfoil 70 along the radial length 224 of the airfoil 70. Additionally, the variable chord length 116 extends a different, second length 116b at a different, second radial position 118b of the airfoil 70 along the radial length 224 of the airfoil 70. In the illustrated embodiment, the first length 116a extends a distance between the trailing edge 73 and the interference edge 82 of the sweep feature 80 along the axial direction 226 that is less than the second length 116b. The variable chord length between the trailing edge 73 and the interference edge 82 decreases from the hub end 114 to the tip end 112 of the airfoil 70. For example, the sweep feature 80 has a variable chord length 116 that is longer at a radial position near the hub end 114 of the airfoil 70 relative to the variable chord length 116 that is shorter at a radial position near the tip end 112 of the airfoil 70. Optionally, the variable chord length may increase from the hub end 114 to the tip end 112 of the airfoil 70 along the radial length 224. Optionally, the sweep feature 80 may have any alternative shape such that the variable chord length 116 may increase and/or decrease at different radial positions of the airfoil 70 along the radial length 224.

In one or more embodiments, one or more of the plural airfoils 70 may include a common or unique sweep feature 80 at the leading edge 71 of each of the plural airfoils 70. Optionally, each of the sweep features 80 of each of the plural airfoils 70 may have common and/or unique shapes, sizes, or the like. Optionally, each of the airfoils 70 about the central axis 11 may include sweep features that may have any alternating or patterned configuration (e.g., common or unique shape and/or size). Optionally, one or more of the airfoils 70 may include sweep features having any configuration of shape and/or size.

The fan frame assembly 60 is one of various frame and support assemblies of the gas turbine engine assembly 12 that are used to facilitate maintaining an orientation of various components within the gas turbine engine assembly 12. For example, the frame and support assemblies interconnect stationary components and provide rotor bearing supports, structural load support, or the like. The fan frame assembly 60 is coupled downstream from the fan assembly 16 within the bypass duct 40 such that the outlet guide vanes 70 are circumferentially spaced apart around the outlet of the fan assembly 16 and extend across the airflow path of the second portion 52 of the airflow that is discharged from the fan assembly 16. For example, looking rearward from the front of the gas turbine engine assembly 12 (not shown), a plurality of airfoils 70 are circumferentially distributed about the central axis 11 of the engine assembly 12.

In one or more embodiments, the fan frame assembly 60 may also include a plurality of struts (not shown) that are coupled between the inner and outer surfaces 104, 102. Optionally, the fan frame assembly 60 may be fabricated in arcuate segments in which flanges are coupled to the outlet guide vanes 70 and/or the struts. Optionally, the outlet guide vanes 70 and/or the struts may be coupled coaxially within the bypass duct 40.

The airfoils 70 integrated with the fan frame assembly 60 increase a structural load support level or a structural load supporting capability of the fan frame assembly 60 relative to the airfoils 70 not being integrated with the fan frame assembly 60. The tip ends 112 and the hub ends 114 of each of the plural airfoils 70 are operably coupled with the outer surface 102 and the inner surface 104, respectively, of the fan frame assembly 60. For example, the plural airfoils 70 may be formed as unitary bodies with one or more components of the fan frame assembly 60.

The trailing edge 73 of the airfoil 70 that is substantially or predominantly radial provides a substantially radial load path between the inner surface 104 and the outer surface 102 of the fan frame assembly 60. For example, the substantially radial trailing edge 73 increases a structural stiffness of the integrated airfoil 70 and fan frame assembly 60 relative to the trailing edge 73 including a sweep feature or a trailing edge that is also swept.

Figure 4:
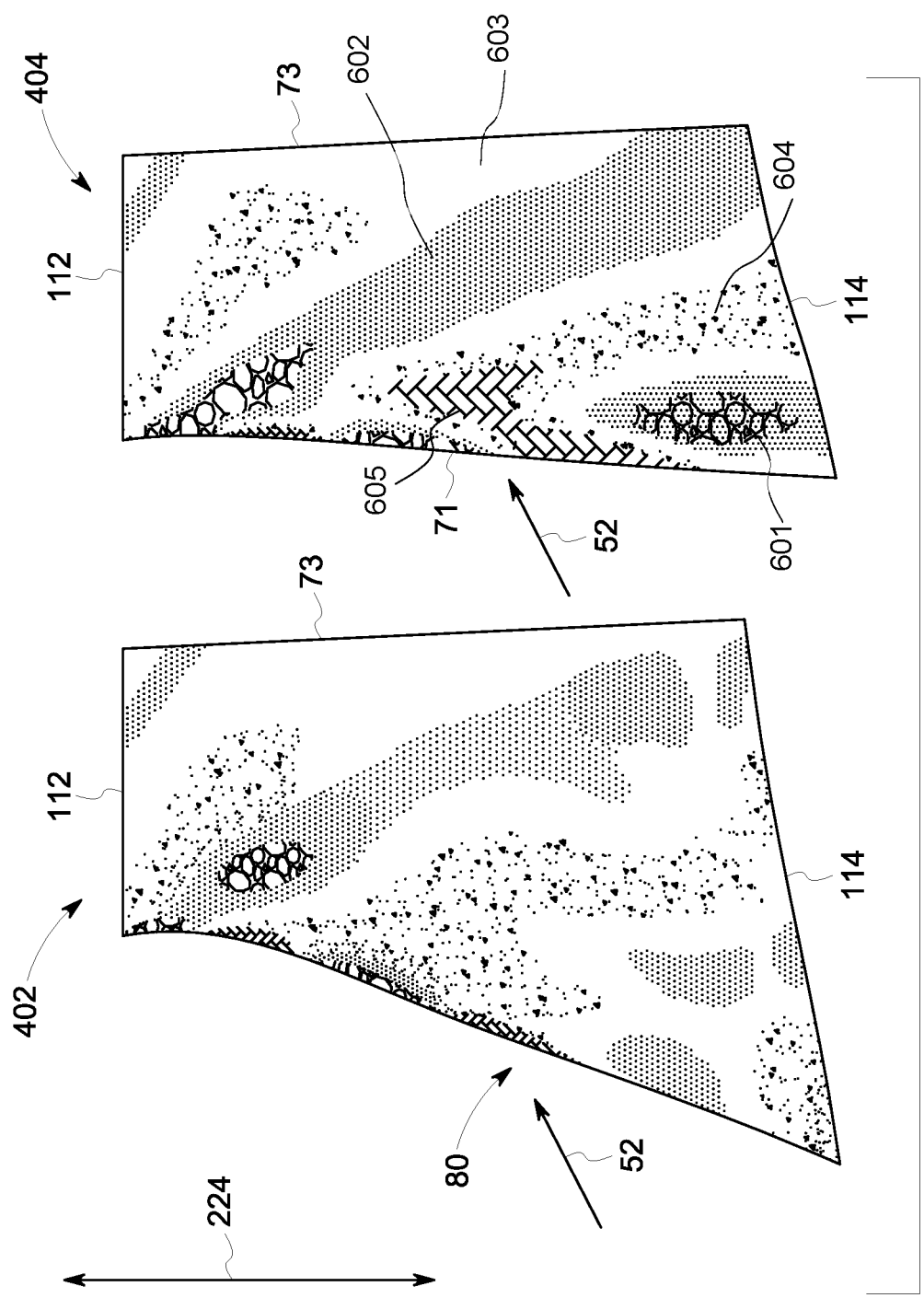
FIG. 4 illustrates unsteady surface pressure exerted by air inside the engine assembly of FIG. 1 in accordance with one embodiment.

FIG. 4 illustrates unsteady surface pressure that is exerted onto the airfoil 70 by air inside the engine assembly 12 in accordance with one embodiment. Unsteady surface pressure at each point refers to the difference between the surface pressure at any instant in time and the average surface pressure over the time it takes for a fan blade to rotate an extent corresponding to the angular extent between two adjacent outlet guide vanes (e.g., the airfoils 70). Airfoil 402 illustrates the airfoil 70 that includes the sweep feature 80 and airfoil 404 illustrates a baseline airfoil that does not include a sweep feature. The interference edge 82 (e.g., the new leading edge 82) of the sweep feature 80 interferes with and alters the second portion 52 of the air that is received from the fan assembly 16.

Illustrated in FIG. 4, the areas shaded in the hatching pattern 601 have a high level of negative unsteady surface pressure, while the hatch pattern 602 denotes areas of moderately negative unsteady surface pressure. Similarly, areas shown by the hatch patterns 605 and 604 have high and moderate levels of positive unsteady surface pressure, respectively. The areas that have no hatching, represented by 603 have an unsteady surface pressure that is substantially zero. For example, the areas of no hatching 603 are quieter than the levels indicated by patterns 601, 602 and patterns 604, 605 such that the unsteady surface pressure levels of 603 are negligible in comparison to the unsteady surface pressure levels of 601, 602, 604, and 605. High values of unsteady surface pressure, whether positive or negative, generally result in higher levels of noise radiated from the airfoils 70. With the inclusion of the sweep feature 80, the air inside the engine assembly 12 is altered and areas of high and low unsteady surface pressure are substantially reduced relative to the leading edge 71 not including the sweep feature 80. Therefore, the sweep feature 80 substantially reduces the interaction noise between the upstream fan assembly 16 and the airfoils 70 (e.g., the outlet guide vanes 70).

Additionally, the sweep feature 80 is shaped in order to change a noise level that is generated by the engine assembly 12. For example, the airfoil 70 including the sweep feature 80 and the substantially radial trailing edge 73 reduces a noise level that is generated by the engine assembly 12 relative to the leading edge 71 of the airfoil 70 not including the sweep feature 80. The interference edge 82 of the sweep feature 80 causes destructive interference in acoustic waves that emanate from the airfoil 70 due to the interaction with wakes in the airflow generated by the upstream fan assembly 16. Altering the flow of air inside the engine assembly 12 reduces a noise level that is generated by the engine assembly 12 relative to the airfoil 70 not including the sweep feature 80.

Figure 5:
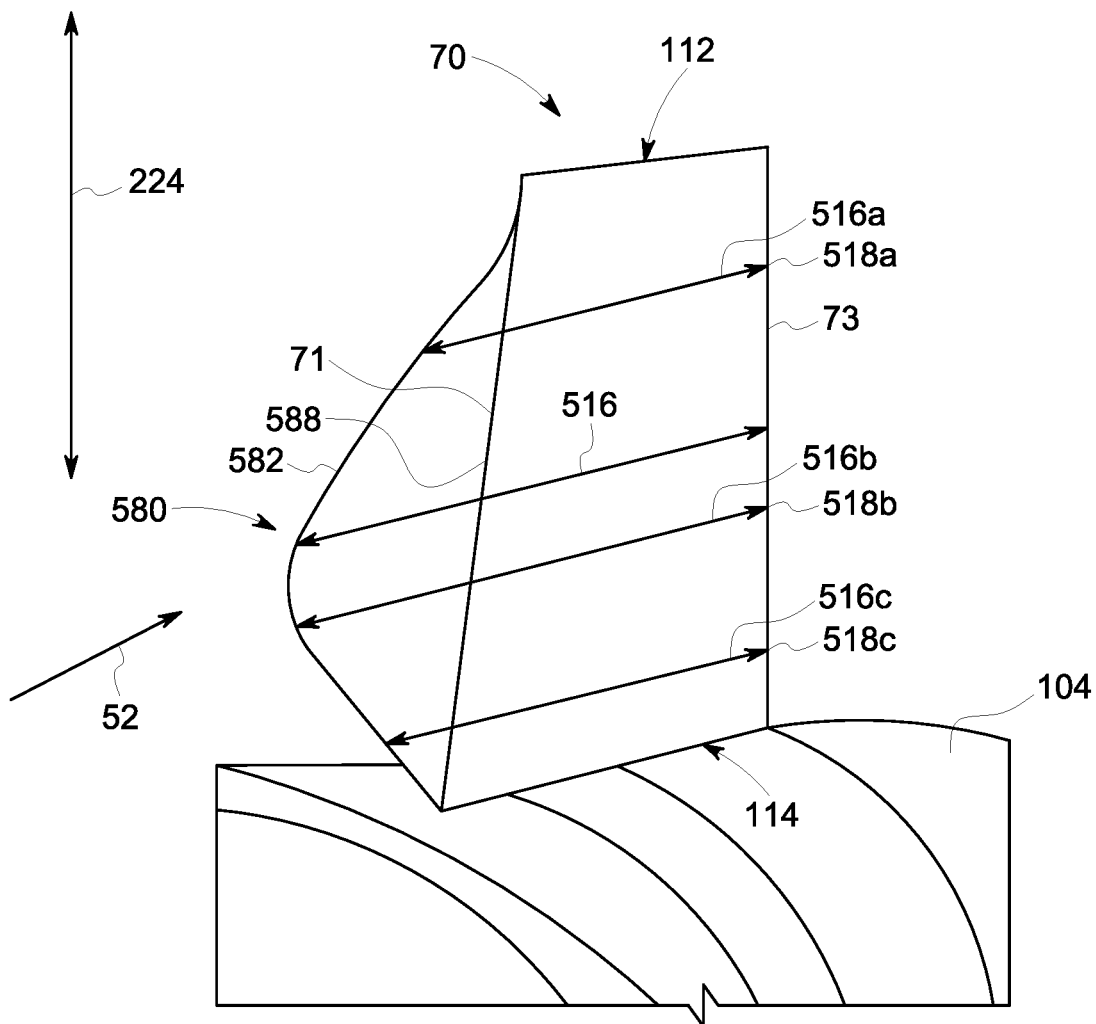
FIG. 5 illustrates a perspective view of an airfoil in accordance with one embodiment.

Introducing the sweep feature 80 changes the effective chord length of the airfoil 70 and can result in increased skin friction losses at the expense of reduced noise levels and increased stiffness. To minimize the skin friction penalty caused by the sweep feature, the sweep feature may be made variable as shown in FIG. 5, which illustrates a perspective view of the airfoil 70 in accordance with one embodiment. The leading edge 71 of the airfoil 70 includes a sweep feature 580. The sweep feature 580 extends between an inner edge 588 and an interference edge 582 along the axial length 226 (of FIG. 2). Optionally, the interference edge 582 may be referred to herein as a new leading edge 582. The new leading edge 582 of the sweep feature 580 includes a non-zero sweep angle relative to a line perpendicular to the central axis 11 (of FIG. 2). For example, the interference edge 582 is distinctly unrelated to the shape of the trailing edge 73 of the airfoil 70. In the illustrated embodiment, the non-zero sweep angle is substantially non-uniform between the hub end 114 and the tip end 112 of the airfoil 70 along the radial length 224.

The sweep feature 580 is separated from or is disposed at a position away or apart from the trailing edge 73 of the airfoil 70 by a distance of a variable chord length 516. For example, the variable chord length 516 varies (e.g., is different or changes) at different radial positions of the airfoil 70. In the illustrated embodiment of FIG. 5, the variable chord length 516 extends a first length 516a at a first radial position 518a of the airfoil 70 along the radial length 224, extends a different, second length 516b at a different, second radial position 518b of the airfoil 70 along the radial length 224, and extends a different, third length 516c at a different, third radial position 518c of the airfoil 70 along the radial length 224. In the illustrated embodiment, the variable chord length 516 increases then decreases from the hub end 114 to the tip end 112 of the airfoil 70 along the radial length 224. For example, the sweep feature 580 has a variable chord length 516 that is longer at a radial position between the hub end 114 and the tip end 112 (e.g., the second length 516b) relative to the variable chord length 516 that is shorter at a radial position near the hub end 114 (e.g., the third length 516C) and near the tip end 112 (e.g., the first length 516a). Optionally, the sweep feature 580 may have a uniform or non-uniform wavy shape along the radial length 224. Optionally, the sweep feature 580 may have any alternative shape along the radial length 224 between the hub end 114 and the tip end 112 of the airfoil 70.

Figure 6:
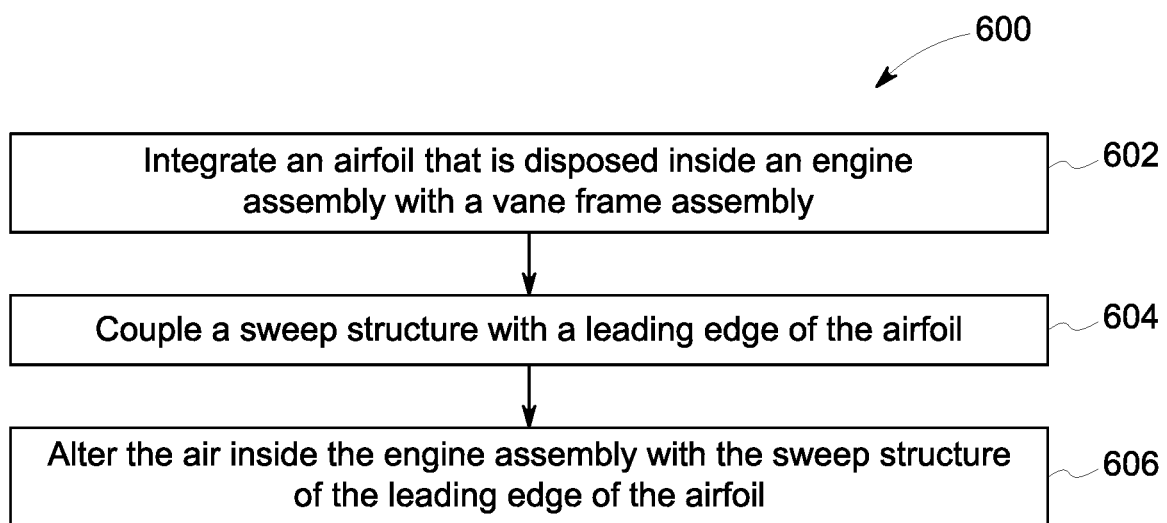
FIG. 6 illustrates a flowchart of a method in accordance with one embodiment.

FIG. 6 illustrates a flowchart of a method 600 in accordance with one embodiment. At 602, an airfoil (e.g., the airfoil 70) that is disposed inside of an engine assembly is integrated with a fan frame assembly (e.g., the fan frame assembly 60). The airfoil 70 may be a guide vane, a blade, or the like. Optionally, the airfoil may be integrated with the fan frame assembly inside of any mechanical assembly.

At 604, a sweep feature (e.g., sweep features 80 or 580) is coupled with a leading edge of the airfoil 70. In one or more embodiments, the sweep feature 80 may be formed as a unitary body with the airfoil 70 at the leading edge 71 of the airfoil 70. Additionally or alternatively, the sweep feature may be coupled with a new or existing airfoil 70. For example, the sweep feature 80 may be retrofitted to a new or existing airfoil 70. The new airfoil 70 may be an airfoil that has not been used for test simulation cycles or has not been used in service during operating duty cycles. The existing airfoil may have been previously used in one or more test simulation cycles or may have been previously used in service during one or more normal operating duty cycles, or the like. The sweep feature 80 may be retrofitted onto the airfoil 70 by any attachment methods such as, but not limited to, welding, bolting, adhering, or the like.

At 606, the sweep feature 80 alters the air inside of the engine assembly. For example, the sweep feature 80 may alter or change the flow of the second portion 52 of the air that is received from the fan assembly 16 (of FIG. 2). Altering the air inside the engine assembly with the sweep feature 80 reduces an unsteady pressure level on the airfoil 70 relative to the leading edge not including the sweep feature 80. Additionally, altering the air inside the engine assembly with the sweep feature 80 reduces a noise level that is generated by the airfoil 70 relative to the leading edge of the airfoil not including the sweep feature 80.

In one embodiment of the subject matter described herein, a system includes an airfoil configured to be disposed inside of an engine assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The airfoil includes a sweep feature disposed at the leading edge of the airfoil. The sweep feature is shaped to alter the air inside the engine assembly. Altering the air inside the engine assembly reduces a surface unsteady pressure level on the airfoil relative to the leading edge not including the sweep feature. The system also includes a fan frame assembly comprising an inner surface and an outer surface. The hub end of the airfoil is configured to be operably coupled with the inner surface of the fan frame assembly and the tip end of the airfoil is configured to be operably coupled with the outer surface of the fan frame assembly. The airfoil is configured to be integrated with the fan frame assembly of the system such that the airfoil increases a structural load supporting capability of the fan frame assembly relative to the airfoil not being integrated with the fan frame assembly.

Optionally, the sweep feature comprises an interference edge having a non-zero sweep angle relative to a line perpendicular to the central axis. The non-zero sweep angle is configured to one or more of increase or decrease along the radial length of the airfoil between the hub end and the tip end.

Optionally, the sweep feature is configured to be retrofitted to the airfoil.

Optionally, the sweep feature of the leading edge is configured to reduce a noise level that is generated by the airfoil relative to the leading edge of the airfoil not including the sweep feature.

Optionally, the trailing edge does not include the sweep feature but is configured to increase a structural stiffness level of the airfoil relative to the trailing edge of the airfoil including a sweep feature.

Optionally, the trailing edge of the airfoil is configured to provide a substantially radial load path between the inner surface and the outer surface of the fan frame assembly along the trailing edge of the airfoil.

Optionally, the sweep feature of the leading edge is separated from the trailing edge by a variable chord length. The variable chord length is configured to extend a first length between the sweep feature and the trailing edge at a first radial position of the airfoil along the radial length of the airfoil and extend a different, second length between the sweep feature and the trailing edge at a different, second radial position of the airfoil along the radial length of the airfoil.

Optionally, the airfoil is one or more of a guide vane or a blade.

In one embodiment of the subject matter described herein, an airfoil is configured to be disposed inside of an engine assembly including a fan frame assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The leading edge of the airfoil includes a sweep feature that is shaped to alter the air inside the engine assembly. Altering the air inside the engine assembly reduces a surface unsteady pressure level on the airfoil relative to the leading edge not including the sweep feature. The hub end of the airfoil is configured to be operably coupled with an inner surface of the fan frame assembly and the tip end of the airfoil is configured to be operably coupled with an outer surface of the fan frame assembly. The airfoil is configured to be integrated with the fan frame assembly such that the airfoil increases a structural load supporting capability of the fan frame assembly relative to the airfoil not be integrated with the fan frame assembly.

Optionally, the sweep feature comprises an interference edge having a non-zero sweep angle relative to a line perpendicular to the central axis. The non-zero sweep angle is configured to one or more of increase or decrease along the radial length of the airfoil between the hub end and the tip end.

Optionally, the sweep feature is configured to be retrofitted to the airfoil.

Optionally, the sweep feature of the leading edge is configured to reduce a noise level that is generated by the airfoil relative to the leading edge of the airfoil not including the sweep feature.

Optionally, the trailing edge does not include the sweep feature but is configured to increase a structural stiffness level of the airfoil relative to the trailing edge of the airfoil including a sweep feature.

Optionally, the trailing edge of the airfoil is configured to provide a substantially radial load path between the inner surface and the outer surface of the fan frame assembly along the trailing edge of the airfoil.

Optionally, the sweep feature of the leading edge is separated from the trailing edge by a variable chord length. The variable chord length is configured to extend a first length between the sweep feature and the trailing edge at a first radial position of the airfoil along the radial length of the airfoil and extend a different, second length between the sweep feature and the trailing edge at a different, second radial position of the airfoil along the radial length of the airfoil.

In one embodiment of the subject matter described herein, a method includes integrating an airfoil configured to be disposed inside an engine assembly with a fan frame assembly. The airfoil is shaped to direct air inside the engine assembly. The airfoil includes a pressure side and a suction side that are coupled together at a leading edge of the airfoil and that are coupled together at a trailing edge of the airfoil that is located downstream from the leading edge. The airfoil extends a radial length away from a central axis of the engine assembly between a hub end of the airfoil and an opposite tip end of the airfoil. The airfoil includes a sweep feature disposed at the leading edge of the airfoil. The sweep feature is shaped to alter the air inside the engine assembly. The fan frame assembly includes an inner surface and an outer surface. The hub end of the airfoil is configured to be operably coupled with the inner surface of the fan frame assembly and the tip end of the airfoil is configured to be operably coupled with the outer surface of the fan frame assembly. The airfoil integrated with the fan frame assembly increases a structural load supporting capability of the fan frame assembly relative to the airfoil not being integrated with the fan frame assembly. The method also includes altering the air inside the engine assembly with the sweep feature of the leading edge of the airfoil. Altering the air inside the engine assembly reduces a surface unsteady pressure level on the airfoil relative to the leading edge not including the sweep feature.

Optionally, the method also includes retrofitting the sweep feature to the airfoil.

Optionally, the sweep feature includes an interference edge having a non-zero sweep angle relative to a line perpendicular to the central axis. The non-zero sweep angle is configured to one or more of increase or decrease along the radial length of the airfoil between the hub end and the tip end.

Optionally, the method also includes reducing a noise level that is generated by the engine assembly with the sweep feature of the leading edge relative to the leading edge of the airfoil not including the sweep feature.

Optionally, the method also includes increasing a structural stiffness level of the airfoil with the trailing edge that does not include the sweep feature relative to the trailing edge of the airfoil including a sweep feature.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further feature.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A retrofit fan frame assembly, comprising:
   a leading edge adjustment component coupleable to an airfoil, the leading edge adjustment component of variable chord length, the variable chord length to increase and then decrease along a radial length from a hub end of the airfoil to an opposite tip end of the airfoil; and
   an attachment mechanism configured to couple the leading edge adjustment component to a leading edge of the airfoil.

2. The retrofit fan frame assembly of claim 1, wherein the attachment mechanism includes at least one of a weld or a bolt.

3. The retrofit fan frame assembly of claim 1, further including the airfoil, wherein the airfoil includes a trailing edge providing a substantially radial load path between an inner surface and an outer surface of the fan frame assembly.

4. The retrofit fan frame assembly of claim 3, wherein the airfoil includes a pressure side and a suction side, the pressure side and the suction side coupled at the leading edge adjustment component.

5. The retrofit fan frame assembly of claim 1, wherein the leading edge adjustment component alters air inside an engine to reduce a surface unsteady pressure level.

6. The retrofit fan frame assembly of claim 1, wherein the increase is a first increase and the decrease is a first decrease, the variable chord length further including a second increase and a second decrease along the radial length from the hub end of the airfoil to the opposite tip end of the airfoil.

7. The retrofit fan frame assembly of claim 1, wherein the leading edge adjustment component has a non-zero sweep angle relative to a line perpendicular to a central axis of the fan frame assembly.

8. The retrofit fan frame assembly of claim 1, wherein the leading edge adjustment component is configured to reduce a noise level that is generated by the airfoil relative to the leading edge of the airfoil not including the leading edge adjustment component.

9. A retrofit fan frame assembly for a gas turbine engine, comprising:
   means for adjusting a leading edge of an airfoil, the means for adjusting having a variable chord length, the variable chord length to increase and then decrease along a radial length from a hub end of the airfoil to an opposite tip end of the airfoil; and
   means for attaching the means for adjusting to the airfoil.

10. The retrofit fan frame assembly of claim 9, further including the airfoil, wherein the airfoil includes means for providing a substantially radial load path between an inner surface and an outer surface of the fan frame assembly.

11. The retrofit fan frame assembly of claim 10, wherein the airfoil further includes means for generating pressure and means for generating suction, the means for generating pressure and the means for generating suction coupled at the means for adjusting the leading edge.

12. The retrofit fan frame assembly of claim 9, wherein the means for adjusting the leading edge alters air inside the gas turbine engine to reduce a surface unsteady pressure level on the airfoil.

13. The retrofit fan frame assembly of claim 9, wherein the increase is a first increase and the decrease is a first decrease, the variable chord length further including a second increase and a second decrease along the radial length from the hub end of the airfoil to the opposite tip end of the airfoil.

14. The retrofit fan frame assembly of claim 9, wherein the means for adjusting the leading edge has a non-zero sweep angle relative to a line perpendicular to a central axis of the fan frame assembly.

15. The retrofit fan frame assembly of claim 9, wherein the means for adjusting the leading edge is configured to reduce a noise level that is generated by the airfoil relative to the leading edge of the airfoil not including the means for adjusting the leading edge of the airfoil.

16. A method of retrofitting a fan frame assembly comprising:
coupling a leading edge adjustment component to an airfoil, the leading edge adjustment component of variable chord length, the variable chord length to increase and then decrease along a radial length from a hub end of the airfoil to an opposite tip end of the airfoil; and
welding or bolting at least part of the leading edge adjustment component to a leading edge of the airfoil.

17. The method of claim 16, wherein the airfoil includes a trailing edge providing a substantially radial load path between an inner surface and an outer surface of the fan frame assembly.

18. The method of claim 17, wherein the airfoil includes a pressure side and a suction side, the pressure side and the suction side coupled at the leading edge adjustment component.

19. The method of claim 16, wherein the increase is a first increase and the decrease is a first decrease, the variable chord length further including a second increase and a second decrease along the radial length from the hub end of the airfoil to the opposite tip end of the airfoil.

20. The method of claim 16, wherein the leading edge adjustment component has a non-zero sweep angle relative to a line perpendicular to a central axis of the fan frame assembly.

\* \* \* \* \*